(12) United States Patent
Burkey

(10) Patent No.: US 7,181,581 B2
(45) Date of Patent: Feb. 20, 2007

(54) METHOD AND APPARATUS FOR MIRRORING DATA STORED IN A MASS STORAGE SYSTEM

(75) Inventor: Todd R. Burkey, Savage, MN (US)

(73) Assignee: Xiotech Corporation, Eden Prairie, MN (US)

( * ) Notice: Subject to any disclaimer, the term of this patent is extended or adjusted under 35 U.S.C. 154(b) by 174 days.

(21) Appl. No.: 10/430,856

(22) Filed: May 5, 2003

(65) Prior Publication Data

US 2003/0212869 A1 Nov. 13, 2003

Related U.S. Application Data

(60) Provisional application No. 60/379,505, filed on May 9, 2002.

(51) Int. Cl.
*G06F 12/16* (2006.01)
(52) U.S. Cl. .................. 711/161; 711/135; 711/114; 714/6; 709/213; 713/178
(58) Field of Classification Search ........ 711/161–162, 711/203–204, 135; 714/6, 13–15, 20–21; 707/200–204
See application file for complete search history.

(56) References Cited

U.S. PATENT DOCUMENTS

| | | | | |
|---|---|---|---|---|
| 5,819,292 A | * | 10/1998 | Hitz et al. | 707/203 |
| 6,038,639 A | * | 3/2000 | O'Brien et al. | 711/114 |
| 6,061,770 A | * | 5/2000 | Franklin | 711/162 |
| 6,101,585 A | * | 8/2000 | Brown et al. | 711/162 |
| 6,182,198 B1 | * | 1/2001 | Hubis et al. | 711/162 |
| 6,216,211 B1 | * | 4/2001 | McBrearty et al. | 711/162 |
| 6,269,431 B1 | * | 7/2001 | Dunham | 711/162 |

(Continued)

OTHER PUBLICATIONS

VERITAS NetBackup 4.0V ServerFree Agent, System Administrator's Guide. Jan. 2001, Veritas, pp. 3-16. Retrieved from http://ftp.support.veritas.com/pub/support/products/NetBackup_DataCenter/NetBackup_AdminGuide_ServerFreeAgent_235045. pdf on Dec. 28, 2005.*

(Continued)

*Primary Examiner*—Brian R. Reugh
*Assistant Examiner*—Jesse Diller
(74) *Attorney, Agent, or Firm*—McDermott Will & Emery

(57) ABSTRACT

A method and apparatus for mirroring data stored in a storage device in a mass storage system by caching mirror coherency synchronization operation requests (break mirror and/or snapshot) from the operating system of a server and rapidly sending an acknowledgement to the server that the mirror operation has been completed. Thereafter, the mass storage system performs the flushing and mirroring processes to establish a mirror of the storage device at a time that is appropriate and convenient for the mass storage system to perform such mirroring. To facilitate such a mirror operation at a later time, the mass storage system may utilize a mirror table containing information concerning the mirror request. This information enables the mass storage system to subsequently flush the cache of data that is pertinent to a time before the mirror request occurred. Consequently, the mirror operation only mirrors data that would have been available for mirroring at the time the mirror request was received from the server. In this manner, the servers are not halted to facilitate mirroring and the mass storage system may mirror the storage device at a convenient time.

12 Claims, 2 Drawing Sheets

U.S. PATENT DOCUMENTS

| | | | |
|---|---|---|---|
| 6,341,341 B1* | 1/2002 | Grummon et al. | 711/162 |
| 6,412,045 B1* | 6/2002 | DeKoning et al. | 711/135 |
| 6,434,681 B1* | 8/2002 | Armangau | 711/162 |
| 6,473,775 B1* | 10/2002 | Kusters et al. | 707/200 |
| 6,526,487 B2* | 2/2003 | Ohran et al. | 711/162 |
| 6,745,294 B1* | 6/2004 | Wilson et al. | 711/135 |
| 6,751,715 B2* | 6/2004 | Hubbard et al. | 711/162 |
| 6,948,038 B2* | 9/2005 | Berkowitz et al. | 711/162 |
| 2001/0047412 A1* | 11/2001 | Weinman | 709/225 |
| 2002/0083037 A1* | 6/2002 | Lewis et al. | 707/1 |
| 2002/0108017 A1* | 8/2002 | Kenchammana-Hoskote et al. | 711/113 |
| 2003/0056038 A1* | 3/2003 | Cochran | 710/36 |
| 2003/0182312 A1* | 9/2003 | Chen et al. | 707/200 |
| 2003/0182313 A1* | 9/2003 | Federwisch et al. | 707/200 |
| 2003/0204510 A1* | 10/2003 | Ball et al. | 707/100 |
| 2003/0212869 A1* | 11/2003 | Burkey | 711/162 |
| 2003/0212870 A1* | 11/2003 | Nowakowski | 711/162 |
| 2004/0049634 A1* | 3/2004 | Cochran | 711/114 |
| 2004/0128470 A1* | 7/2004 | Hetzler et al. | 711/209 |
| 2004/0186900 A1* | 9/2004 | Nakano et al. | 709/213 |
| 2004/0210795 A1* | 10/2004 | Anderson | 714/6 |
| 2005/0004979 A1* | 1/2005 | Berkowitz et al. | 709/203 |
| 2005/0005070 A1* | 1/2005 | Lam | 711/135 |
| 2005/0071379 A1* | 3/2005 | Kekre et al. | 707/200 |
| 2005/0071549 A1* | 3/2005 | Tross et al. | 711/113 |
| 2005/0160118 A1* | 7/2005 | Berkwitz et al. | 707/204 |
| 2005/0273555 A1* | 12/2005 | Factor et al. | 711/113 |

OTHER PUBLICATIONS

Minwen Ji, Alistair Veitch, John Wilkes. "Seneca: Remote Mirroring Done Write". Proceedings of USENIX Technical Conference (San Antonio, TX), pp. 253-268, Jun. 2003. USENIX, Berkeley, CA.*

* cited by examiner

METHOD AND APPARATUS FOR MIRRORING DATA STORED IN A MASS STORAGE SYSTEM

CROSS-REFERENCE TO RELATED APPLICATIONS

This application claims benefit of U.S. provisional patent application Ser. No. 60/379,505, filed May 9, 2002, which is herein incorporated by reference.

BACKGROUND OF THE INVENTION

1. Field of the Invention

The present invention generally relates to mass storage systems and, more particularly, to mass storage systems that store redundant data.

2. Description of the Related Art

Data storage systems are used within computer networks and systems to store large amounts of data that is used by multiple servers and client computers. Generally, one or more servers are connected to the storage system to supply data to and from a computer network. The data is transferred through the network to various users or clients. The data storage system generally comprises a controller that interacts with one or more storage devices such as one or more Winchester disk drives or other forms of data storage. To facilitate uninterrupted operation of the server as it reads and writes data from and to the storage system, as well as executes application programs for use by users, the storage system comprises a write cache that allows data from the server to be temporarily stored in the write cache prior to being written to a storage device. As such, the server can send data to the storage system and quickly be provided an acknowledgement that the storage system has stored the data. The acknowledgement is sent even though the storage system has only stored the data in the write cache and is waiting for an appropriate, convenient time to store the data in a storage device. As is well known in the art, storing data to a write cache is much faster than storing data directly to a disk drive. Consequently, the write cache buffers a large amount of data in anticipation of subsequent storing of that data in a storage device.

To ensure that a malfunction of the storage device does not render all the data on the device useless, the data is generally backed up on a periodic basis. Generally, the operating system in the server will periodically request a backup be performed. Upon a request from the operating system or directly from the user being received by the mass storage system, the storage system mirrors one storage device or volume to another storage device or volume, i.e., copying all the data currently stored in a first storage device to a second storage device. The data in the second storage device can be written to a backup media such as a tape drive at the point of mirror coherency synchronization in the storage system (either at the beginning of a mirror operation in a snapshot storage system or at a point when the mirror is broken on other storage system models.) Mirror coherency synchronization is a term that may be defined as the proper flushing of the operating system at a point in time to ensure that the mirror (or snapshot) of the first storage device is accurate and usable from the operating systems' point of view. This can be achieved via commands from the OS to all applications to flush (synchronize) their data storage information, then having the OS do the same, and then pausing momentarily while the OS tells the storage system to break the mirror or perform the snapshot. At this point, it is the storage systems' responsibility to ensure an accurate copy is created on the second storage device (the mirror storage device). This means that the data that is in the write cache at the time of the request for the mirroring process must be written to the storage devices prior to completion of the break mirror or snapshot operation. The process for writing the data contained in the write cache to the storage devices is referred to as "flushing" the write cache. An operating system that is performing such a mirror operation will generally set an amount of time in which the write cache can be flushed as well as an amount of time for the break mirror or snapshot process to be accomplished, since all OS level activity and applications will generally be suspended for this amount of time. For some operating systems, this period of time may be less than 10 seconds for performing both operations.

In large mass storage systems that have large write caches and two or more virtual volumes of storage devices comprising arrays of physical storage devices such as Winchester disk drives, the amount of time allocated by the operating system for flushing and mirroring may not always be sufficient to perform the entire task. As such, the application programs executing on the server that requested the mirror coherency synchronization operation will be halted until the mirroring process is complete, causing some applications and potentially some operating systems to crash as a result.

Therefore, there is a need in the art for a method and apparatus that reduces the amount of time required to perform this mirror coherency synchronization task within mass storage systems that utilize write cache.

SUMMARY OF THE INVENTION

The disadvantages associated with the prior art are overcome by a method and apparatus for mirroring data stored in a storage device of a mass storage system by caching mirror coherency synchronization operation requests from the operating system of a server and rapidly sending an acknowledgement to the server that the mirror operation has been completed. Thereafter, the mass storage system performs the flushing and mirror break or snapshot processes to establish a usable mirror of the storage device at a time that is appropriate and convenient for the mass storage system to utilize the mirror. To facilitate such a mirror operation at a later time, the mass storage system may utilize a mirror table containing information concerning the mirror request. This information enables the mass storage system to subsequently flush the cache of data that is pertinent to a time before the mirror request occurred. Consequently, the mirror operation only mirrors data that would have been available for mirroring at the time the mirror request was received from the server. In this manner, the servers are not halted to facilitate the mirror operation and the mass storage system may utilize the mirrored storage device at a convenient time.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
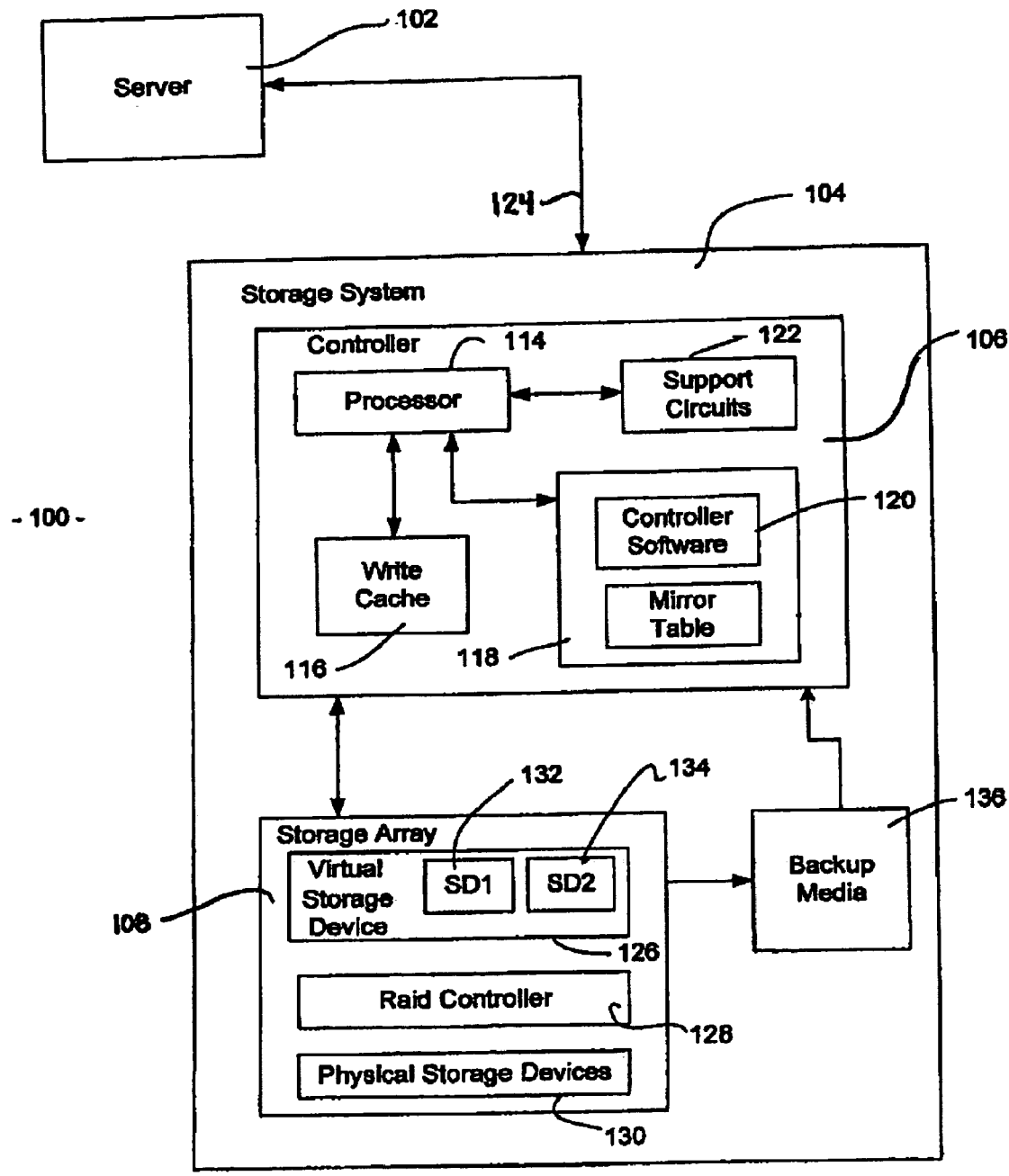
FIG. 1 depicts a simplified block diagram of a computer system comprising a mass storage system coupled to a server.

FIG. 1 depicts a computer system 100 comprising a server 102 coupled to mass storage system 104. The server may be one of many servers that are coupled to the mass storage system 104 through a network or other communications interface 124. The interface 124 couples command and control information as well as data from the server 102 to and from the mass storage system 104. As such, data and commands for storing and retrieving data are sent from the server 102 along interface 124 to the mass storage system 104.

The mass storage system 104 comprises a controller 106 and a storage array 108. The storage array 108 may be any form of readable/writable storage for digital data such as Winchester disk drives, magneto-optical storage, and the like. The storage array 108 may include multiple physical storage devices that are arranged in arrays that may or may not comply with one or more of the various RAID standards. More specifically, storage array 108 comprises a virtual storage device layer 126 specifically containing, for example, virtual storage device 132 and virtual storage device 134, a RAID compliant layer 128 and the actual physical storage device layer 130. In this manner, the controller 106 may arrange the physical storage devices in various configurations to form various storage volumes within the virtual storage device layer 126. The server 102 sends instructions to store information in the virtual storage device 132 of layer 126, while the controller 106 facilitates mapping the data access requests to the physical storage device in layer 130 in a manner that creates a fault-tolerant storage system for the data.

Mass storage system 104 may also comprise backup media 136 which may or may not be co-located with the mass storage system 104. In some instances, the backup media 136, for example a tape drive, may be located remotely from the mass storage system 104 and coupled to the mass storage system 104 via a network interface. In other instances, the backup media may be coupled to the mass storage system 104 indirectly via a server (not shown) that has the backup media attached, with the server connected directly to the mass storage system via a SAN connection (i.e. fibre channel connections).

The controller of the mass storage system 104 comprises a processor 114, write cache 116, support circuits 122, and memory 118. The write cache 116 is used in a conventional manner by the processor to buffer data that is to be stored in the storage device 108 from the server 102. Memory 118 stores control software 120 that is executed by the processor 114 to perform the method of the present invention (see FIG. 3). The memory 118 also stores a mirror table that may be used by the control software 120 to perform the method of the present invention. The support circuits 122 comprise conventional, well-known circuitry such as clocks, cache, power supplies, input/out circuitry, and the like. The general structure and operation of the controller 106 is in accordance with known mass storage system controllers except for the execution of software 120 that facilitates the mirroring of storage device 132 to storage device 134 in accordance with the present invention.

Under normal operating conditions, the server 102 provides a write command and data to the controller 106. The controller 106 stores the data in the write cache 116 while responding to the server's request for storage with an acknowledgement that the data has been stored. At a convenient time to the mass storage system 104, the controller 106 sends the data from the write cache 116 to the storage device 132 for storage. Over time and in response to demands for storage within the mass storage system, the write cache 116 conveys a large amount of data to be written to the storage devices 126. To protect the data within the storage devices 132, the controller 106 has the ability via software 120 within memory 118 to copy and mirror the data from one storage device 132 to a second storage device 134. Additionally, any data that is stored in the write cache 116 at the time of a mirror coherency synchronization operation must also be written to storage device 132 as well as to mirror storage device 134. The execution of the mirroring software 120 is initiated by the server issuing a request for a snapshot or mirror operation (followed by a break mirror operation).

After a mirror operation has begun and before a coherency synchronization request has been received, the software 120 copies the data on storage device 132 to storage device 134, normally sector-by-sector, until the entire contents of storage device 132 are copied to storage device 134. While a mirroring operation is in effect, any data flushed from write cache 116 to storage device 132 is also flushed to storage device 134.

Upon the server issuing a coherency synchronization request to the mass storage system 104, the storage system acknowledges the request immediately upon receipt by sending an acknowledgement through network 124 to server 102. The acknowledgement indicates to the server 102 that the mirror operation has been received and has been accomplished. At a convenient time to the controller 106, the write cache 116, is stored in second storage device 134, and the storage devices 132 and 134 are said to be coherent. Since the mirror operation has already been acknowledged, at this point the second storage device 134 can be used for the backup process by copying its information to the backup media 136, while the first storage device can continue to be used by the server for data storage, provided that instead of backing up the data on the second storage device 134 for data that still resides in the write cache 116, the backup is made from the write cache data and not from the data on the second storage device 134. Furthermore, if a read command is generated to data either on the first or second storage devices, 132 or 134, before the flush is completed, the storage system responds by sending the server 102 data from the write cache 116 rather than data from storage device one or storage device two, 132 or 134.

Figure 2:
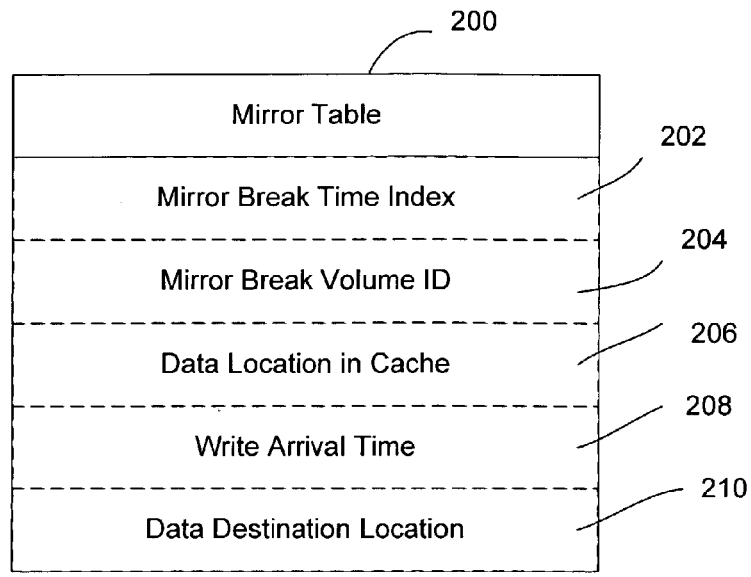
FIG. 2 depicts a mirror table that is used by one embodiment of the mass storage system of FIG. 1.
Figure 3:
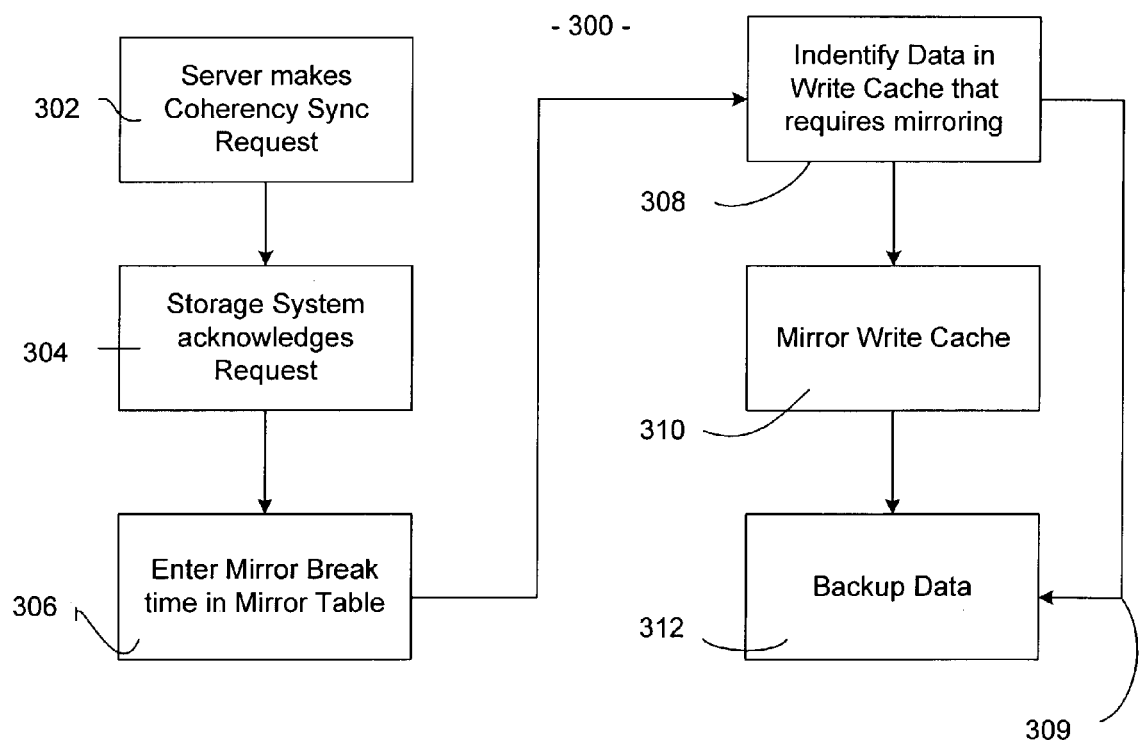
FIG. 3 depicts a flow diagram of the process of the present invention as performed by the computer system of FIG. 1.

FIG. 2 depicts a mirror table 200 that contains information used by the process of FIG. 3 to facilitate mirror coherency synchronization of the first storage device 132 to the second storage device 134. FIG. 3 depicts a flow diagram of one embodiment of a process 300 in accordance with the present invention for mirroring a storage device. For best understanding of the invention, the reader should simultaneously refer to FIGS. 2 and 3. The process 300 begins with the controller 106 receiving a mirror coherency synchronization request from the server 102. This is also known as a request for a mirror break or in some implementations of the invention this may also be called a snapshot. The mirror coherency synchronization request ends (breaks) an existing mirror process, allowing the use of the mirrored second storage device 134 as a point in time coherent copy of the first storage device 132. Thereafter, the mirrored storage device (second storage device) is used for performing a backup of the data in the original storage device (first storage device) at the time that the mirror break was requested. At step 304, the storage system 104 acknowledges to the server 102 that the mirror break has been completed. This acknowledgement is sent before the mirror break process is actually performed. As such, the server continues to operate under the belief that the mirror break process has been completed, the data on second storage device 134 is a coherent, synchronized copy of the data on for storage device 132 and that the backup will be performed. Consequently, the server 102 is not impacted at all by performing a mirroring operation or backup.

At step 306, the process 300 enters a mirror break time index in the mirror table 200. The mirror break time index may be the actual, real time of occurrence of the mirror break request or, more likely, the mirror break time index merely identifies the point in the write cache that the mirror break request occurred. In one embodiment, the mirror table 200 comprises the mirror break time index 202, a mirror break volume identification 204 that identifies which volume is to be mirrored, the data location 206 in the cache of the data that is to be mirrored, the write arrival time index 208 that identifies at what time index the data was entered into the write cache, and a data destination location 210 that identifies what volume the data within the write cache is to be written. These fields enable the controller 106 to identify data in the write cache 116 that is to be flushed to fulfill the mirror request. This data is identified by the time the data was written to the write cache, the time the mirror request occurred, and the volume into which the data is to be written. If the data is to be written to the volume that is being mirrored and the data was written to the write cache prior to the mirror coherency synchronization request being received, then the data is to be flushed to the storage device(s) involved in the mirror process. The same data may also be used to respond to read commands to either first storage or second storage device, 132 or 134. This simultaneous flushing and backup is indicated by the dual path from step 308, one to step 310 where the write cache data is flushed to the second storage device 134, and a second path, 309, directly to the backup step 312 that may begin as soon as the coherency synchronization request is acknowledged.

Some or all of the fields within the mirror table 200 may be contained in the write cache 116 itself such that they will not be duplicated in a separate mirror table. In one embodiment of the invention, a mirror table is not used at all and the write cache contains additional information identifying the mirror break time index associated with each of the data stored in the write cache. In one implementation, the mirror break time (sequence) index is initialized at 0 and the index 0 is associated with each data that is stored in the write cache until a mirror break command is received from the server. After the mirror break request has been received, the mirror break time index is raised to the value 1 such that all data that has a mirror break time index of 0 is known to have been written to the write cache before the mirror break request and all data after the mirror break request is identified by a index 1. Such a mirror break time index process is continued for each mirror break such that the mirror break time index is increased by 1 for each occurrence of a mirror break.

Regardless of whether a time or a sequence index is used, the present invention permits multiple mirror breaks before write cache data is actually flushed to the storage devices 132 or 134. If data is written into the cache 116 after a mirror break has been acknowledged but before the flushed is complete, it is possible that the new data may be directed to the same storage locations as the data still residing in the cache that has yet to be flushed in response to a prior mirror coherency synchronization request. In this circumstance, the new data will have a time or sequence index later than or higher than the earlier, unflushed data. A read command directed to this location on the first storage device 132 is satisfied with the most current write cache data as indicated by the break sequence time index. In contrast, if a read command is directed to the same location on the second storage device 134, the read command is fulfilled with the oldest write cache data according to time or sequence index, i.e., the data that has yet to be flushed to in response to the coherency synchronization request. Furthermore, the control software causes the flushing of the data from the write cache to continue until all the data earmarked for flushing has been written to the respective storage devices 132 or 134. However, it does this flushing in time index or sequence index order, the oldest data first.

At step 302, the process 300 identifies data in the write cache that requires mirroring. That is, the data in the write cache is identified as being stored prior to the mirror break request. Additionally, the data in the write cache identified as being prior to the mirror break request also must be involved with the data storage volume that is being mirrored. As such, some data that was written to the write cache prior to the mirror break may not be involved in the mirroring process, because it is to be stored on a data volume not involved in the mirroring.

At step 310, the process 300 mirrors the write cache data identified in step 308. A conventional mirroring process is generally used to copy the data in the first virtual storage device 132 to the second virtual storage device 134. When the coherency synchronization request is received, the data is flushed from the write cache and written to the first and second virtual storage devices 132, 134. Once mirroring is complete, the mirror is broken from a storage system point of view, even though it was actually broken from the servers point of view at step 306, allowing the first virtual storage device to be used again to store new data immediately after step 306.

At step 312, the data that is mirrored to the second storage device may be used for other purposes such as backing up the data stored on the second virtual storage device. The backup process involves writing the information from the second storage device to the backup media at step 312. It is important to note that, with this invention, from a server point of view, there is no latency from step 306 to step 312, consequently, a backup copy of the data is created for the data that was stored in the first virtual storage device at the time the mirror break request was made by the server.

While foregoing is directed to the preferred embodiment of the present invention, other and further embodiments of the invention may be devised without departing from the basic scope thereof, and the scope thereof is determined by the claims that follow.

What is claimed is:

1. A method of mirroring a storage device comprising:
   receiving a request at a mass storage system from a server to perform a mirror coherency synchronization operation that synchronizes mirrored data from a first storage device to a second storage device;

prior to performing the mirroring operation, sending, to the server, an acknowledgement that the mirroring operation had been completed;

identifying data in a write cache that requires mirroring;

copying the identified data in the write cache to the second storage device;

responding to read commands directed to the second storage device with unflushed data from the write cache instead of data from the second storage device; and responding to read commands directed to the first storage device with unflushed data from the write cache instead of data from the first storage device.

2. The method of claim 1 further comprising marking the data within the write cache as being written to the write cache before or after the mirroring request has been received.

3. The method of claim 2 further comprising responding to read commands directed to the second storage device with the oldest write cache data as indicated by said marking.

4. The method of claim 3 further comprising responding to read command directed to the first storage device with the newest write cache data as indicated by said marking.

5. The method of claim 1 further comprising storing in a mirror table information that identifies data within the write cache as being written to the write cache before or after the mirroring request has been received.

6. An apparatus for mirroring a storage device comprising:

a controller, within a mass storage system, for receiving from a server a request to perform a mirroring operation that synchronizes mirror data from a first storage device to a second storage device, said controller sends prior to performing the mirroring operation, an acknowledgement to the server that indicates that the mirroring operation has been completed;

means for identifying data in a write cache that requires mirroring;

means for copying the identified data in the write cache and data in the first storage device to the second storage device, means for responding to read commands directed to the second storage device with unflushed data from the write cache instead of data from the second storage device; and means for responding to read commands directed to the first storage device with unflushed data from the write cache instead of data from the first storage device.

7. The apparatus of claim 6 further comprising means for marking the data within the write cache as being written to the write cache before or after the mirroring request has been received.

8. The apparatus of claim 7 further comprising means for responding to read commands directed to the second storage device with the oldest write cache data as indicated by said marking.

9. The apparatus of claim 8 further comprising means for responding to read commands directed to the first storage device with the newest write cache data as indicated by said marking.

10. The apparatus of claim 6 further comprising a mirror table comprising information that the identifies data in the write cache as being written to the write cache before or after the mirroring request has been received.

11. A computer readable medium comprising software that, when executed by a computer, causes a mass storage system to perform a method of mirroring a storage device, the method comprising:

receiving a request at a mass storage system from a sewer to perform a mirror coherency synchronization operation that synchronizes mirrored data from a first storage device to a second storage device;

prior to performing the mirroring operation, sending, to the server, an acknowledgment that the mirroring operation had been completed;

identifying data in a write cache that requires mirroring;

copying the identified data in the write cache to the second storage device;

responding to read commands directed to the second storage device with unflushed data from the write cache instead of data from the second storage device; and responding to read commands directed to the first storage device with unflushed data from the write cache instead of data from the first storage device.

12. The method of claim 11 further comprising marking the data within the write cache as being written to the write cache before or after the mirror coherency synchronization request has been received.

* * * * *